(12) United States Patent
Wong et al.

(10) Patent No.: US 6,956,990 B2
(45) Date of Patent: Oct. 18, 2005

(54) REFLECTING WEDGE OPTICAL WAVELENGTH MULTIPLEXER/DEMULTIPLEXER

(75) Inventors: Marvin Glenn Wong, Woodland Park, CO (US); Arthur Fong, Colorado Springs, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 284 days.

(21) Appl. No.: 10/413,270

(22) Filed: Apr. 14, 2003

(65) Prior Publication Data

US 2004/0202414 A1 Oct. 14, 2004

(51) Int. Cl.[7] ............................ G02B 6/26; G02B 6/42; H04J 14/00
(52) U.S. Cl. ............................ 385/25; 385/15; 385/16; 385/31; 385/36; 385/50; 398/43
(58) Field of Search ............................ 385/15, 16, 25, 385/31, 36, 50; 398/43

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Von Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A | 1/1981 | Kolodzey et al. |
| 4,336,570 A | 6/1982 | Brower |
| 4,419,650 A | 12/1983 | John |
| 4,434,337 A | 2/1984 | Becker |
| 4,475,033 A | 10/1984 | Willemsen et al. |
| 4,505,539 A | 3/1985 | Auracher et al. |
| 4,582,391 A | 4/1986 | Legrand |
| 4,628,161 A | 12/1986 | Thackrey |
| 4,652,710 A | 3/1987 | Karnowsky et al. |
| 4,657,339 A | 4/1987 | Fick |
| 4,742,263 A | 5/1988 | Harnden, Jr. et al. |
| 4,786,130 A | 11/1988 | Georgiou et al. |
| 4,797,519 A | 1/1989 | Elenbaas |

(Continued)

FOREIGN PATENT DOCUMENTS

EP 0593836 A1 10/1992

(Continued)

OTHER PUBLICATIONS

Bhedwar, Homi C. et al. "Ceramic Multilayer Package Fabrication." Electronic Materials Handbook, Nov. 1989, pp. 460-469, vol. 1 Packaging, Section 4: Packages.

(Continued)

*Primary Examiner*—Brian Healy
*Assistant Examiner*—Mary El-Shammaa

(57) ABSTRACT

A method and apparatus for multiplexing and demultiplexing optical signals. The apparatus includes first and second optical waveguides coupled via an optical coupler. The optical coupler has a coupling waveguide and an optical switching wedge attached to a piezoelectric actuator. In operation, first and second optical signals are received by the first and second optical waveguides, respectively. If the signals are to be combined, the optical switching wedge is moved to a first position where it is optically coupled to the first optical waveguide. The first optical signal is then transmitted, via the coupling waveguide, to the second optical waveguide, where it is combined with the second optical signal. If the signals are not to be combined, the optical switching wedge is moved to a second position where it is optically uncoupled from the first optical waveguide.

13 Claims, 3 Drawing Sheets

U.S. PATENT DOCUMENTS

| | | |
|---|---|---|
| 4,804,932 A | 2/1989 | Akanuma et al. |
| 4,988,157 A | 1/1991 | Jackel et al. |
| 5,278,012 A | 1/1994 | Yamanaka et al. |
| 5,415,026 A | 5/1995 | Ford |
| 5,502,781 A | 3/1996 | Li et al. |
| 5,644,676 A | 7/1997 | Blomberg et al. |
| 5,675,310 A | 10/1997 | Wojnarowski et al. |
| 5,677,823 A | 10/1997 | Smith |
| 5,751,074 A | 5/1998 | Prior et al. |
| 5,751,552 A | 5/1998 | Scanlan et al. |
| 5,828,799 A | 10/1998 | Donald |
| 5,841,686 A | 11/1998 | Chu et al. |
| 5,849,623 A | 12/1998 | Wojnarowski et al. |
| 5,874,770 A | 2/1999 | Saia et al. |
| 5,875,531 A | 3/1999 | Nellissen et al. |
| 5,886,407 A | 3/1999 | Polese et al. |
| 5,889,325 A | 3/1999 | Uchida et al. |
| 5,912,606 A | 6/1999 | Nathanson et al. |
| 5,915,050 A | 6/1999 | Russell et al. |
| 5,972,737 A | 10/1999 | Polese et al. |
| 5,994,750 A | 11/1999 | Yagi |
| 6,021,048 A | 2/2000 | Smith |
| 6,180,873 B1 | 1/2001 | Bitko |
| 6,201,682 B1 | 3/2001 | Mooij et al. |
| 6,207,234 B1 | 3/2001 | Jiang |
| 6,212,308 B1 | 4/2001 | Donald |
| 6,215,919 B1 * | 4/2001 | Li et al. ................. 385/16 |
| 6,225,133 B1 | 5/2001 | Yamamichi et al. |
| 6,278,541 B1 | 8/2001 | Baker |
| 6,304,450 B1 | 10/2001 | Dibene, II et al. |
| 6,320,994 B1 | 11/2001 | Donald et al. |
| 6,323,447 B1 | 11/2001 | Kondoh et al. |
| 6,351,579 B1 | 2/2002 | Early et al. |
| 6,356,679 B1 | 3/2002 | Kapany |
| 6,373,356 B1 | 4/2002 | Gutierrez et al. |
| 6,396,012 B1 | 5/2002 | Bloomfield |
| 6,396,371 B2 | 5/2002 | Streeter et al. |
| 6,408,112 B1 | 6/2002 | Bartels |
| 6,446,317 B1 | 9/2002 | Figueroa et al. |
| 6,453,086 B1 | 9/2002 | Tarazona |
| 6,470,106 B2 | 10/2002 | McClelland et al. |
| 6,477,289 B1 * | 11/2002 | Li ........................... 385/16 |
| 6,487,333 B2 | 11/2002 | Fouquet |
| 6,501,354 B1 | 12/2002 | Gutierrez et al. |
| 6,512,322 B1 | 1/2003 | Fong et al. |
| 6,515,404 B1 | 2/2003 | Wong |
| 6,516,504 B2 | 2/2003 | Schaper |
| 6,559,420 B1 | 5/2003 | Zarev |
| 6,633,213 B1 | 10/2003 | Dove |
| 2002/0037128 A1 | 3/2002 | Burger et al. |
| 2002/0146197 A1 | 10/2002 | Yong |
| 2002/0150323 A1 | 10/2002 | Nishida et al. |
| 2002/0168133 A1 | 11/2002 | Saito |
| 2003/0035611 A1 | 2/2003 | Shi |

FOREIGN PATENT DOCUMENTS

| | | |
|---|---|---|
| FR | 2418539 A | 9/1979 |
| FR | 2458138 A1 | 10/1980 |
| FR | 2667396 | 9/1990 |
| JP | SHO 36-18575 | 10/1961 |
| JP | SHO 47-21645 | 10/1972 |
| JP | 63-276838 | 5/1987 |
| JP | 01-294317 | 5/1988 |
| JP | 08-125487 A | 5/1996 |
| JP | 9161640 | 6/1997 |
| WO | WO 99/46624 A1 | 9/1999 |

OTHER PUBLICATIONS

"Integral Power Resistors for Aluminum Substrate." IBM Technical Disclosure Bulletin, Jun. 1984, US, Jun. 1, 1984, p. 827, vol. 27, No. 1B, TDB-ACC-NO: NB8406827, Cross Reference: 0018-8689-27-1B-827.

Kim, Joonwon et al. "A Micromechanical Switch with Electrostatically Driven Liquid-Metal Droplet." Sensors and Actuators, A: Physical. v 9798, Apr. 1, 2002, 4 pages.

Jonathan Simon, "A Liquid-Filled Microrelay With A Moving Mercury Microdrop" (Sep. 1997), Journal of Microelectromechinical Systems, vol. 6, No. 3, pp 208-216.

Marvin Glenn Wong, "A Piezoelectrically Actuated Liquid Metal Switch", May 2, 2002, patent application (pending, 12 pages of specification, 5 pages of claims, 1 page of abstract, and 10 sheets of drawings (Figs. 1-10).

* cited by examiner

REFLECTING WEDGE OPTICAL WAVELENGTH MULTIPLEXER/DEMULTIPLEXER

CROSS REFERENCE TO RELATED APPLICATIONS

This application is related to the following co-pending U.S. patent applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10041329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of optical switching relays, and in particular to a method and apparatus for multiplexing and de-multiplexing optical signals.

BACKGROUND OF THE INVENTION

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of bubbles in liquid. Mirrors do not allow for selective switching of different optical wavelengths.

SUMMARY

A method and apparatus for multiplexing and demultiplexing optical signals. First and second optical waveguides are coupled via an optical coupler. The optical coupler comprises a coupling waveguide and an optical switching wedge attached to a piezoelectric actuator. In operation, first and second optical signals are received by the first and second optical waveguides, respectively. If the signals are to be combined, the optical switching wedge is moved to a first position where it is optically coupled to the first optical waveguide. The first optical signal is then transmitted, via the coupling waveguide, to the second optical waveguide, where it is combined with the second optical signal. If the signals are not to be combined, the optical switching wedge is moved to a second position where it is optically uncoupled from the first optical waveguide.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
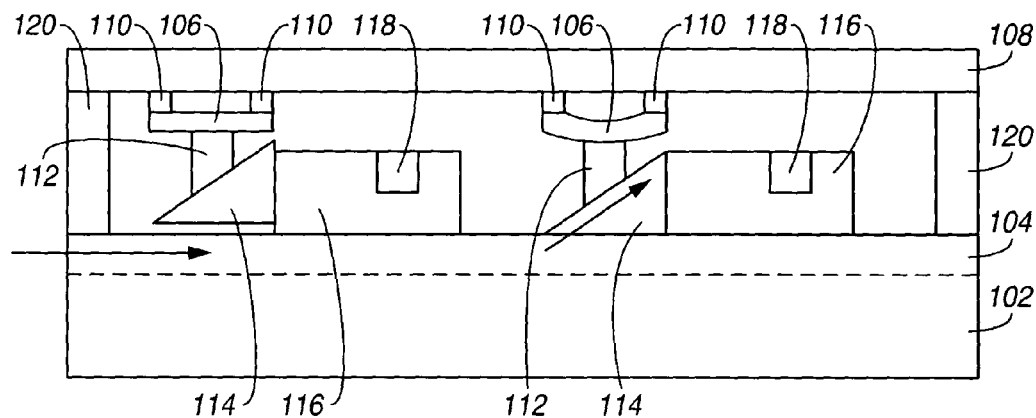
FIG. 1 is a side view of an optical multiplexer/demultiplexer consistent with a certain embodiment of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

Piezoelectric materials and magnetorestrictive materials (collectively referred to as "piezoelectric" materials below) deform when an electric or magnetic field is applied.

The present invention relates to a piezoelectrically actuated optical multiplexer/demultiplexer. In one embodiment, the device enables the switching of optical signals with specific wavelengths to multiplex or demultiplex them. The device may be used for multimode signal transmission as it depends on the internal reflection of the radiation from the walls of the waveguide.

The particular embodiment described below uses two levels of optical waveguides, arranged orthogonal to one another. This embodiment illustrates the principle of device operation, but in general the device may have multiple levels of waveguides.

A side view of an exemplary embodiment of the invention is shown in FIG. 1. The device may be enclosed in a housing (not shown) or hermetically sealed. Referring to FIG. 1, the optical multiplexer/demultiplexer 100 comprises a lower substrate 102. One or more lower optical waveguides 104 are formed in grooves in the substrate. Piezoelectric actuators 106 are attached to a top layer 108 by standoffs 110. Spacers 112 couple the optical switching wedges 114 to the piezoelectric actuators. When energized, the piezoelectric actuators 106 move the optical switching wedges 114 downwards so that they make contact with the upper surface of the lower optical waveguides 104. An upper substrate 116 is positioned on top of the lower substrate and contains upper optical waveguides 118 formed in grooves in the upper substrate. The upper optical waveguides are optically coupled to the optical switching wedges 114. The top layer 108 may be attached to the lower substrate 102 via end supports 120. The end supports hold the top layer at the required distance from the lower substrate so the optical switching wedges 114 can be moved in and out of contact with the lower optical waveguides 104.

Figure 2:
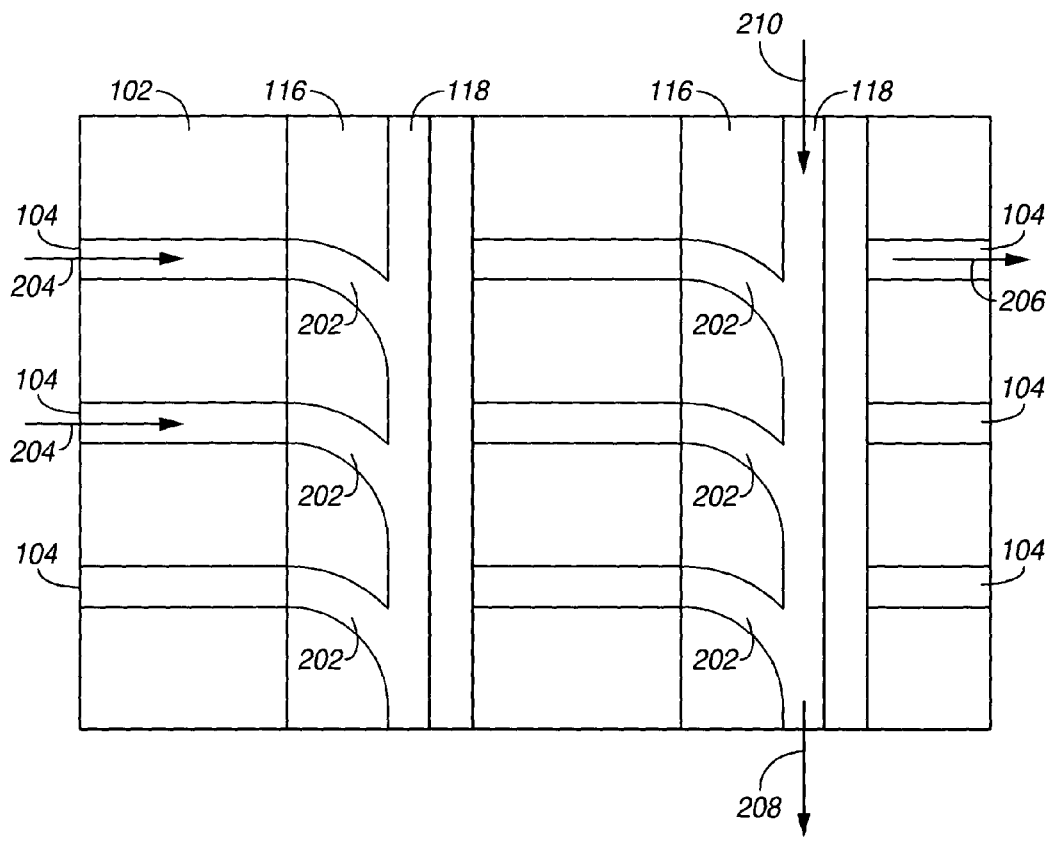
FIG. 2 is a top view of a lower portion of an optical multiplexer/demultiplexer consistent with a certain embodiment of the present invention.

FIG. 2 is a top view of the optical multiplexer/demultiplexer with the top layer, the actuators and the optical switching wedges removed. Referring to FIG. 2, the upper waveguides 118 are optically coupled to curved coupling waveguides 202, also embedded in grooves in the upper substrate. One end of a coupling waveguide is optically coupled to the upper waveguide while the other end is optically coupled to the optical switching wedge. In operation, optical signals enter the lower waveguides 104 as indicated by arrows 204 and, if not switched, proceed through to the other ends of the waveguides and out of the switching device as indicated by arrow 206. In addition, further optical signals may enter the upper waveguides 118 as indicated by the arrow 210. If a piezoelectric actuator is energized, the corresponding optical wedge comes in contact with a lower waveguide thereby allowing the optical signal in the waveguide to enter the optical switching wedge. The lower face of the optical switching wedge has index matching coatings for good light transmission. In one embodiment of the invention, the optical switching wedge also incorporates a band-pass optical filter so that only the light having the wavelength of interest is allowed to enter the wedge. The light passes through a face at the other end of the optical wedge and enters a coupling waveguide in the upper substrate. The mating faces of the optical wedge and coupling waveguide have anti-reflection coatings to facilitate good light transmission without the need for physical contact. The piezoelectric actuator, the optical switching wedge and the coupling waveguides form an optical coupler between the lower and upper optical waveguides.

Figure 3:
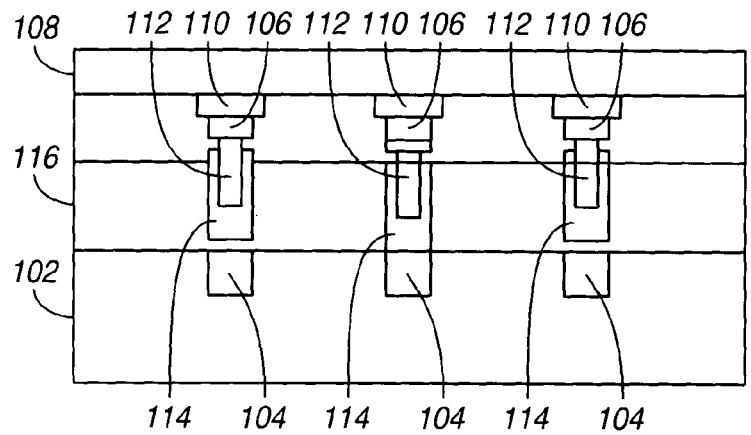
FIG. 3 is an end view of an optical multiplexer/demultiplexer consistent with a certain embodiment of the present invention.

FIG. 3 is an end view of an optical multiplexer/demultiplexer consistent with a certain embodiment of the present invention. Lower optical waveguides 104 are formed in grooves in the lower substrate 102. Optical switching wedges 114 may be lowered into contact with the lower optical waveguides so that light couples from the waveguide to the wedge. The light is than transmitted into upper optical waveguides (202 and 116 in FIG. 2) embedded in the upper substrate 116. The optical switching wedges are attached via spacers 112 to the piezoelectric actuators 106. The actuators are in turn attached via rigid standoffs 110 to the top layer 108. In operation, the actuators 106 are energized by applying an electric voltage across one or more piezoelectric elements in the actuator. The piezoelectric elements may be arranged in a stack or layer and may deform in a bending mode, a shear mode or an extensional mode. Electric circuitry (not shown) to supply control signals to piezoelectric actuators 106 may be formed on the top layer 108.

Figure 4:
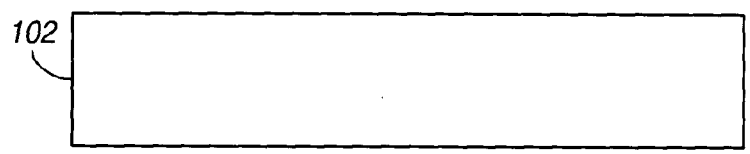
FIG. 4 is an end view illustrating a first manufacturing step of an optical multiplexer/demultiplexer consistent with a certain embodiment of the present invention.
Figure 5:
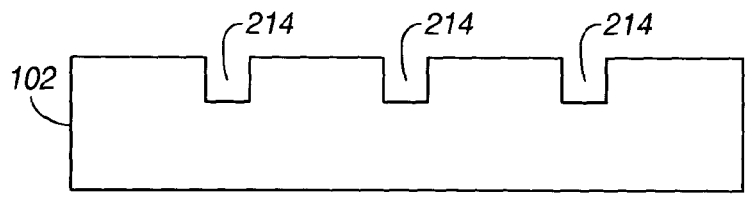
FIG. 5 is an end view illustrating a second manufacturing step of an optical multiplexer/demultiplexer consistent with a certain embodiment of the present invention.
Figure 6:
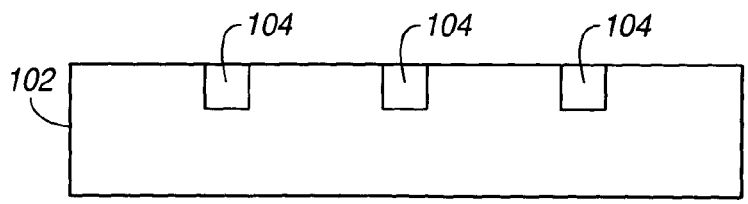
FIG. 6 is an end view illustrating a third manufacturing step of an optical multiplexer/demultiplexer consistent with a certain embodiment of the present invention.

In accordance with one aspect of the present invention, the optical multiplexer/demultiplexer may be manufactured by a method of micro-machining. Micro-machining methods are commonly used in the manufacture of micro-electronic devices. FIGS. 4–6 show end views of three stages of one embodiment of the method of manufacture of the optical multiplexer/demultiplexer. In this embodiment of the method, the lower substrate 102 is formed first as shown in FIG. 4. Then, as shown in FIG. 5, a series of grooves 214 are formed in the top of the lower substrate, using etching or laser ablation techniques for example. Lower optical waveguides 104 are then formed, as shown in FIG. 6, by inserting waveguide material into the grooves in the lower optical substrate 102. The waveguide material may by solid or may be a liquid that solidifies after being placed in the grooves.

Figure 7:
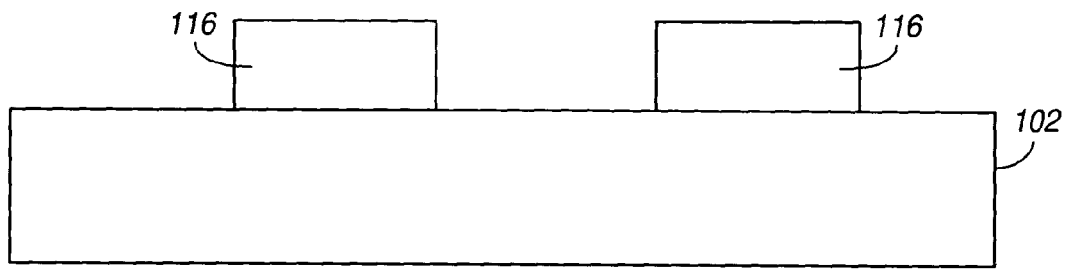
FIG. 7 is a side view illustrating a fourth manufacturing step of an optical multiplexer/demultiplexer consistent with a certain embodiment of the present invention.
Figure 8:
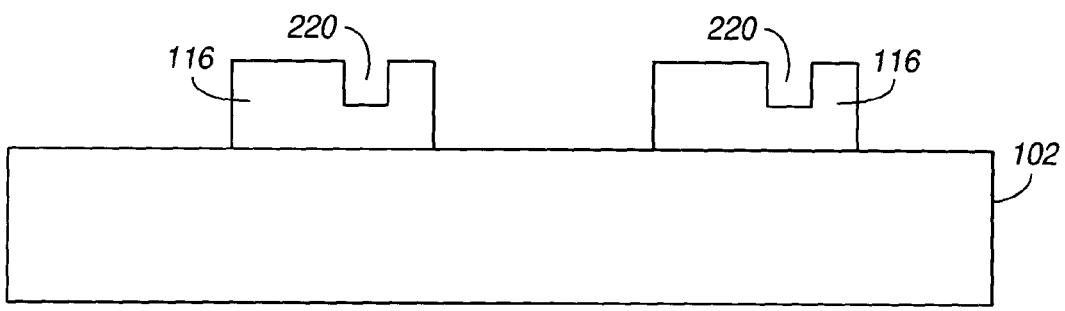
FIG. 8 is a side view illustrating a fifth manufacturing step of an optical multiplexer/demultiplexer consistent with a certain embodiment of the present invention.
Figure 9:
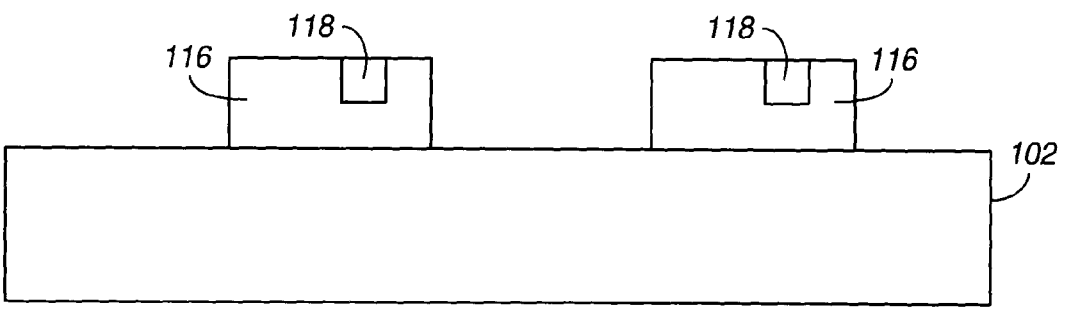
FIG. 9 is a side view illustrating a sixth manufacturing step of an optical multiplexer/demultiplexer consistent with a certain embodiment of the present invention.

FIGS. 7–9 show side views of three further stages of manufacture of the optical multiplexer/demultiplexer. Referring to FIG. 7, an upper substrate layer 116 is added on top of the lower substrate 102. The upper substrate may be deposited as a complete layer and then portions removed, or the parts of the upper substrate may be added separately. Grooves 220 are then formed in the upper substrate as shown in FIG. 8. The upper optical waveguides 118 are then formed, as shown in FIG. 9, by inserting waveguide material into the grooves in the upper substrate. The coupling waveguides (202 in FIG. 2) are formed in the same manner.

In this embodiment of the method, the electrical circuitry for the actuator control signals is formed as traces deposited on the surface of the top layer. Once the piezoelectric actuators and the optical switching wedges are fixed to the top layer, the optical multiplexer/demultiplexer is assembled by supporting the top layer relative to the waveguide layers. This may be done by adding end supports (120 in FIG. 1) to the lower substrate 102. Additional supports may be added to the sides of the optical multiplexer/demultiplexer to provide a hermetic seal. In a further embodiment, the lower (waveguide) and upper (actuator/wedge) portions of the multiplexer/demultiplexer are assembled in a housing that incorporates optical connectors to facilitate the coupling of optical signals to the device.

Piezoelectric devices have high bandwidth, hence the switching time for a device of the present invention is short (on the order of 10 microseconds in one embodiment) when the device is constructed on a small scale using micromachining techniques.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An optical multiplexer/demultiplexer, comprising:
   a first optical waveguide operable to receive a first optical signal;
   a second optical waveguide; and
   an optical coupler operable to couple the first optical signal from the first optical waveguide to the second optical waveguide, the optical coupler comprising:
      an optical switching wedge;
      a coupling waveguide adapted to transmit light from the optical switching wedge to the second optical waveguide; and
      a piezoelectric actuator operable to move the optical switching wedge between a first position, in which the optical switching wedge is optically coupled to the first optical waveguide, and a second position, in which the optical switching wedge is optically uncoupled from the first optical waveguide.

2. An optical multiplexer/demultiplexer in accordance with claim 1, further comprising:
a plurality of first optical waveguides;
a plurality of second optical waveguides; and
a plurality of optical couplers, each operable to couple a first optical waveguide of the plurality of first optical waveguides to a second optical waveguide of the plurality of second optical waveguides.

3. An optical multiplexer/demultiplexer in accordance with claim 1, wherein the piezoelectric actuator is operable to deform in one of a bending mode, an extensional mode and a shear mode.

4. An optical multiplexer/demultiplexer in accordance with claim 1, wherein the second optical waveguide is operable to receive a second optical signal, and wherein the optical coupler is operable to combine the first optical signal with the second optical signal.

5. An optical multiplexer/demultiplexer in accordance with claim 1, wherein a face of the optical switching wedge and an end of the coupling waveguide have anti-reflection coatings to facilitate optical coupling between the optical switching wedge and the coupling waveguide without a need for physical contact.

6. An optical multiplexer/demultiplexer in accordance with claim 1, wherein a face of the optical switching wedge that contacts the first optical waveguide has an index matching coating to facilitate light transmission between the first optical waveguide and the optical switching wedge.

7. An optical multiplexer/demultiplexer in accordance with claim 1, wherein a face of the optical switching wedge that contacts the first optical waveguide incorporates a band-pass optical filter, whereby the optical coupler is operable to transmit light of specified wavelengths between the first optical waveguide and the second optical waveguide.

8. An optical multiplexer/demultiplexer in accordance with claim 1, wherein the second optical waveguide is positioned above the first optical waveguide and oriented in a different direction to the first optical waveguide.

9. An optical multiplexer/demultiplexer in accordance with claim 8, wherein the optical switching wedge is positioned above the first optical waveguide and is moveable in a vertical direction.

10. A method for selectively combining a first optical signal and a second optical signal in an optical multiplexer/demultiplexer, the method comprising;
receiving an input optical signal in a first optical waveguide, the input optical signal containing the first optical signal;
receiving the second optical signal in a second optical waveguide;
if the signals are to be combined:
moving an optical switching wedge to a first position where it is optically coupled to the first optical signal in the first optical waveguide and transmits the first optical signal to a coupling waveguide;
transmitting the first optical signal along the coupling waveguide to the second optical waveguide; and
combining the first optical signal with the second optical signal; and
if the signals are not to be combined:
moving the optical switching wedge to a second position where it is optically uncoupled from the first optical waveguide.

11. A method in accordance with claim 10, wherein moving the optical switching wedge comprising energizing and de-energizing a piezoelectric actuator by application of an electrical voltage.

12. A method in accordance with claim 10, wherein the input optical signal comprises a plurality of component optical signals having different wavelengths and wherein the first optical signal comprises a subset of the plurality of component optical signals.

13. A method in accordance with claim 10, wherein the second optical signal comprises a plurality of component optical signals having different wavelengths and wherein the input optical signal comprises a subset of the plurality of component optical signals.

* * * * *